United States Patent [19]

Curtis

[11] 3,774,178

[45] Nov. 20, 1973

[54] CONVERSION OF NRZ DATA TO SELF-CLOCKING DATA

[75] Inventor: Delmar E. Curtis, Los Altos, Calif.

[73] Assignee: International Video Corporation, Sunnyvale, Calif.

[22] Filed: Aug. 18, 1971

[21] Appl. No.: 172,648

[52] U.S. Cl. .......... 340/174.1 G
[51] Int. Cl. .......... G11b 5/02
[58] Field of Search .......... 340/174.1 G, 174.1 H, 340/347 DD; 307/235 A

[56] References Cited

UNITED STATES PATENTS

| | | | |
|---|---|---|---|
| 3,414,894 | 12/1968 | Jacoby | 340/174.1 G |
| 3,422,425 | 1/1969 | Vallee | 340/347 DD |
| 3,626,395 | 12/1971 | Quiogue | 340/174.1 G |
| 3,524,075 | 8/1970 | Matthews et al. | 307/235 A |

*Primary Examiner*—Vincent P. Canney
*Attorney*—Karl A. Limbach, John P. Sutton, Thomas A. Gallagher, George C. Limbach, J. William Wigert, Jr. and Gerald P. Parsons

[57] ABSTRACT

An improved digital encoder and decoder for high density magnetic recording. An NRZ code and clock are combined in a single encoded signal to provide a Pouliart code. The encoder provides a simple straightforward encoding logic; the decoder includes an analog slope detector/comparator to detect flux transitions and means to correct an erroneous clock synchronization.

11 Claims, 6 Drawing Figures

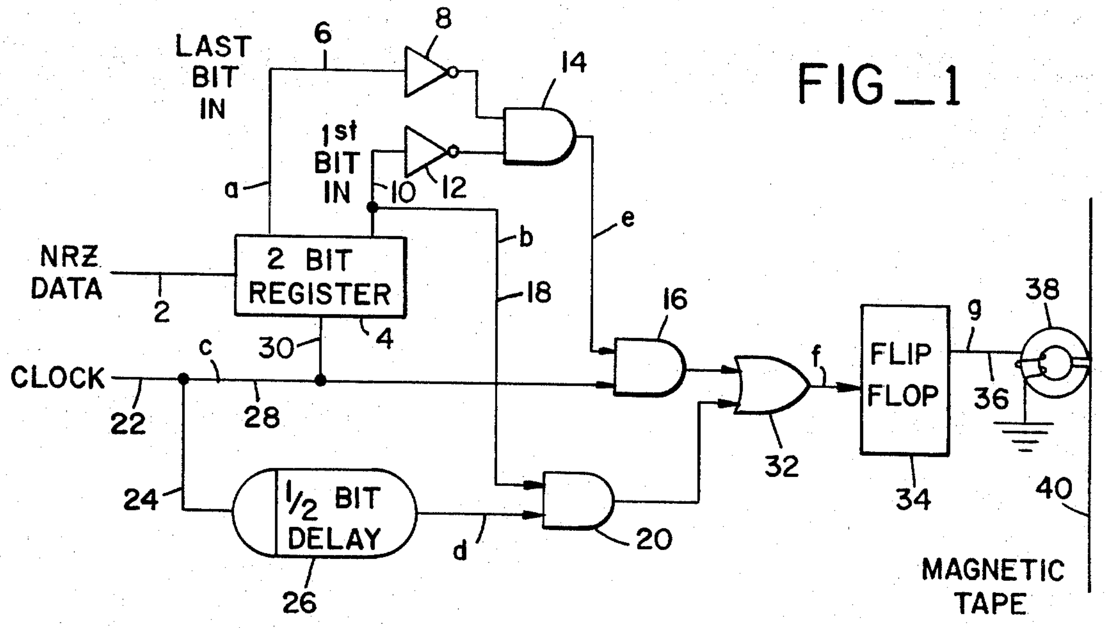
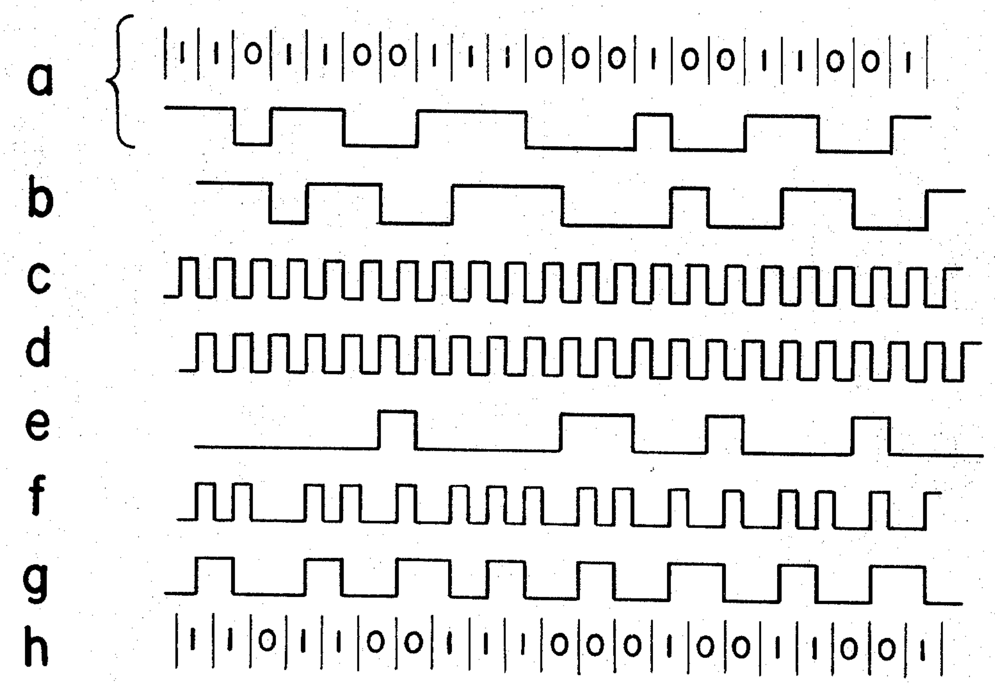
FIG_2
INVENTOR.
DELMAR E. CURTIS
BY
Limbach, Limbach & Sutton
ATTORNEYS

INVENTOR.
DELMAR E. CURTIS

BY
Linbach, Linbach & Sutton

ATTORNEYS

INVENTOR.
DELMAR E. CURTIS
BY
Limbach, Limbach & Sutton
ATTORNEYS

INVENTOR.
DELMAR E. CURTIS
BY
Limbach, Limbach & Sutton
ATTORNEYS

CONVERSION OF NRZ DATA TO SELF-CLOCKING DATA

BACKGROUND OF THE INVENTION

The present invention relates to high density recording techniques and more particularly to the encoding and decoding of a modified NRZ code of the type described by W. H. Pouliart et al in U.S. Pat. No. 2,807,004.

The conventional NRZ code is unsuitable for self-clocking. For example, long strings of O's produce no flux changes thus increasing the probability of losing clock synchronism. Thus NRZ codes require a separate clock channel. In magnetic data recording it is undesirable to have a separate clock channel, hence the Pouliart type code is used which breaks up long strings of O's by the insertion of flux transitions between adjacent O bits. At the same time it is desirable to minimize the flux transitions in order to maximize the recorded data density. In other words, the clock must be combined with the NRZ signal in an efficient way.

In order to generate the Pouliart code, a knowledge of the succeeding bit is required before a magnetic flux transition is initiated; hence the record current must be delayed with respect to the input data.

SUMMARY OF THE INVENTION

The encoder according to the present invention combines NRZ digital information and a clock signal into a phase encoded signal utilizing a phase-encoded technique in which a flux transition occurs in the middle of each bit cell containing a one and between adjacent bit cells containing zeros.

The decoder derives the originally encoded NRZ signal and separate clock signal. In one portion of the decoder an analog delay line and slope detector looks at the recorded waveform to detect flux transitions.

Other details and advantages of the invention will become apparent as the following specification and claims are read and understood.

BRIEF DESCRIPTION OF THE DRAWINGS

FIG. 1 is a block diagram of the encoder.

FIG. 2 is a series of waveforms useful in understanding FIG. 1.

DESCRIPTION OF THE PREFERRED EMBODIMENTS

Figure 3:
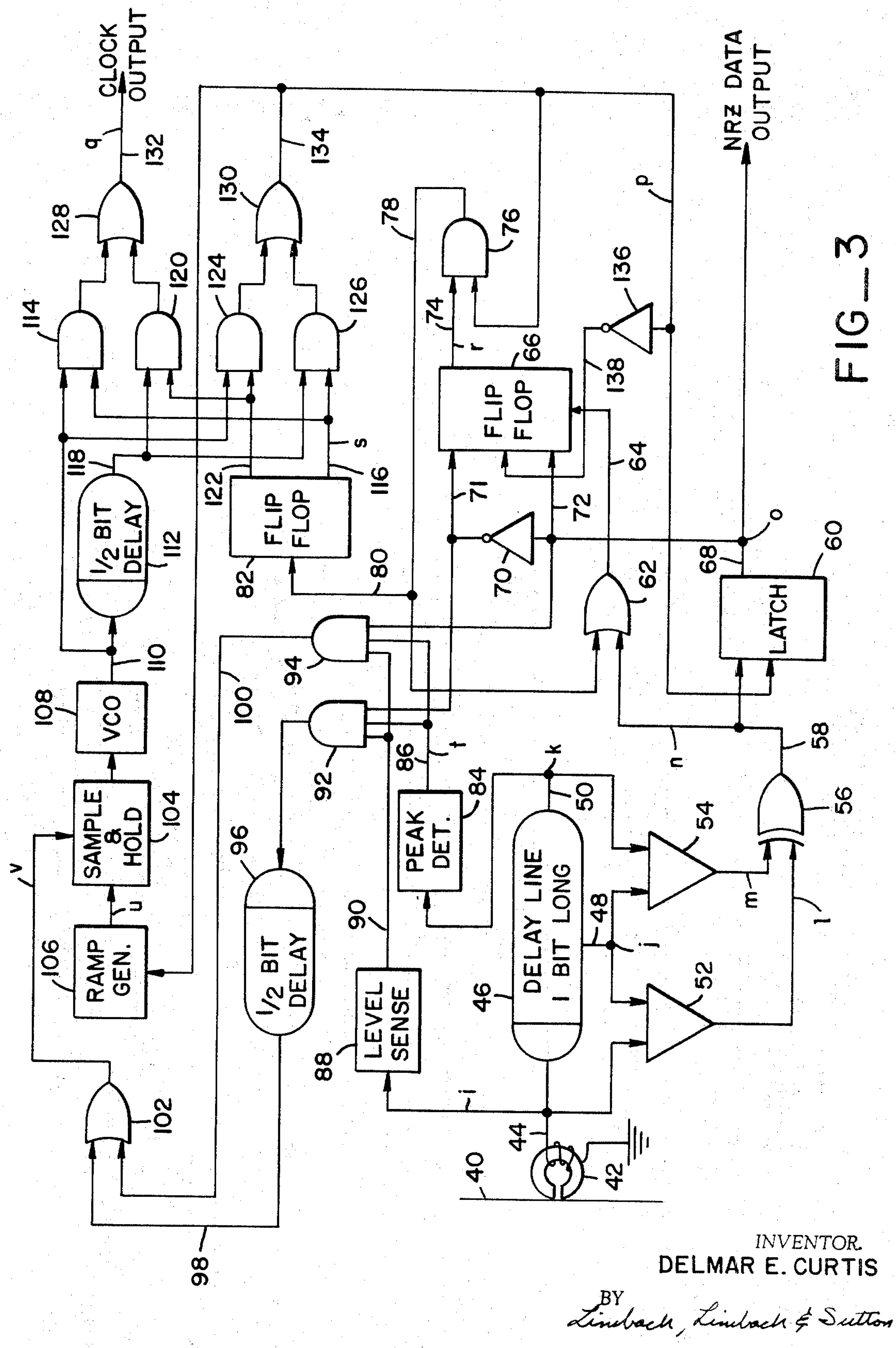
FIG. 3 is a block diagram of the decoder.

Referring now to FIG. 1 of the drawings wherein a schematic block logic diagram is shown and to FIG. 2 wherein various waveforms are shown that occur in different portions of the circuit of FIG. 1. FIG. 2 *a* shows a standard nonreturn to zero (NRZ) waveform in response to binary data: level is high for each 1 bit and low for each O data bit cell. FIG. 2*b* is the NRZ data of FIG. 2*a* delayed one bit and is the waveform that is encoded. FIG. 2*c* is the clock signal accompanying the NRZ signal of FIG. 2*a*; FIG. 2*d* is the clock signal delayed one-half bit.

The NRZ input data is applied on line 2 and the clock signal is applied on line 22. The NRZ data on line 2 is applied to the data input of a two-bit register 4. The clock signal is applied to the shift input of register 4 via line 30. The last bit in (or the most recent bit) in the register 4 is provided as an output on line 6 to an inverter 8. The first bit in is provided as an output from register 4 on line 10 to an inverter 12 and on line 18 to one input of AND gate 20. The waveform on line 6 is shown as the waveform in part a of FIG. 2, and the waveform on line 18 is shown as the waveform in part b of FIG. 2. It will be seen that the waveforms are identical, however, waveform b is delayed by one bit period. The outputs of inverters 8 and 12 are applied to an AND gate 14. The output of AND gate 14 is shown as waveform *e* in FIG. 2. The other input of AND gate 16 is the clock signal on line 28. The output of AND gate 16 is applied as one of the inputs to an OR gate 32. The clock input is also applied via line 24 to a one-half bit delay unit 26, the output of which is shown as waveform d in FIG. 2 and is applied as one of the inputs to AND gate 20. The output at AND gate 20 is applied as one of the inputs to OR gate 32. The output of OR gate 32 shown in FIG. 2 as waveform f is applied to a flip-flop 34 that has its output connected via line 36 to a transducer 38, which can be a recording head, for example, that is in record relationship with a recording medium 40, which can be magnetic tape, for example. The signal on line 36 is shown as waveform g in FIG. 2 and is the encoded signal recorded on the magnetic tape corresponding to the data as shown at part *h* of FIG. 2.

In operation, the output of AND gate 14 (FIG. 2*e*) is true when both outputs of register 4 (FIGS. 2*a* & 2*b*) are O, indicating that the bit being encoded is a O followed by a O.

The output of OR gate 32 is true when line 18 (FIG. 2*b*), the delayed NRZ data signal, and the delayed clock (FIG. 2*d*) occur simultaneously or when AND gate 14 (FIG. 2*c*) is true and the clock on line 28 (FIG. 2*c*) occur simultaneously. The former combination picks out all the middle of the 1's (but delayed one bit), while the latter picks out the double O's. The resultant clock length pulses from OR gate 32 (FIG. 2f) control flip-flop 34 that toggles each time the OR gate goes true, to generate a signal on line 36 (FIG. 2*g*) that results in a flux reversal in the recording medium in the middle of 1 bits and between adjacent O bits.

Figure 4:
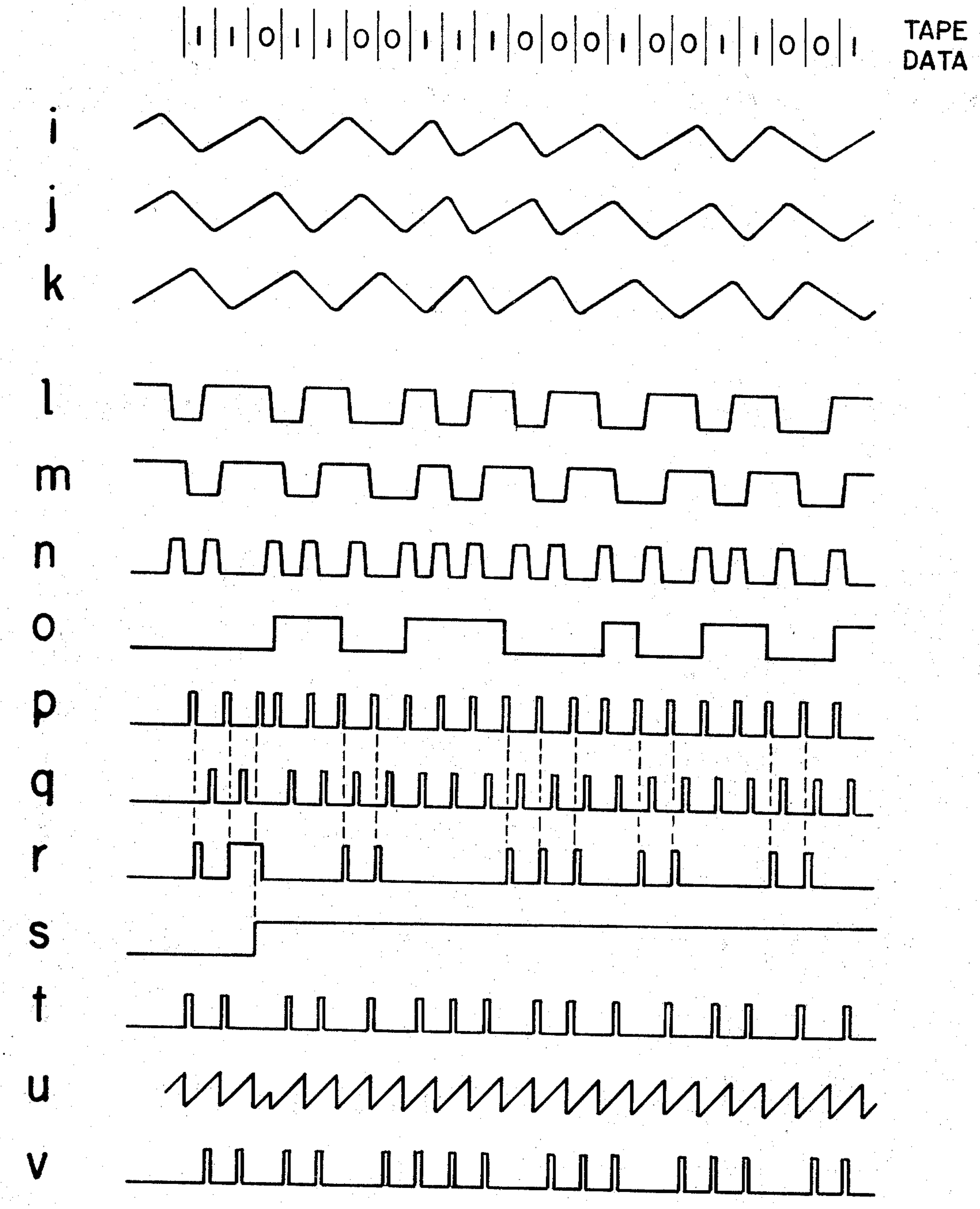
FIG. 4 is a series of waveforms useful in understanding FIG. 3.

Referring now to FIGS. 3 and 4 of the drawings wherein a schematic block diagram of the data encoder and a series of waveforms usefu in understanding the block diagram are shown, respectively. A reproduce transducer such as magnetic head 42 is in playback relationship to the magnetic medium 40. The signal from the transducer 42 is applied on line 44 to a level sense unit 88, to a one bit long delay line 46 and to one input of a differential amplifier 52. The signal on line 44 (corresponding to the tape data) is shown in part *i* of FIG. 4. A tap midway on the line 46 provides a half bit delay output on line 48 as shown in part *j* of FIG. 4 that is applied to the remaining input of differential amplifier 52 and to one input of differential amplifier 54. The full bit delay output of delay line 46 is provided at line 50 and is shown in waveform *k* in FIG. 4. Line 50 is connected to a peak detector 84 and to the remaining input of differential amplifier 54. The output of amplifier 52 shown as waveform *l* and the output of amplifier 54 shown as waveform $m$ are applied to the inputs of an EXCLUSIVE OR gate 56. The gate output on line 58 shown as waveform $n$ is applied to the data input of a latch 60 and to one input of an OR gate 62. The output of latch 60 on line 68 is the decoded NRZ data output as shown in waveform $o$. Line 68 is also connected to line 72 that forms the low data input to flip-flop 66 and is also connected to an inverter 70 that has its output connected to the high data input of flip-flop 66 on line 71. An internal clock signal on line 75 as shown in waveform $p$ is applied as the strobe input to latch 60 and to an inverter 136 whose output on line 138 is applied to the toggle input of flip-flop 66. The flip-flop output on line 74 is applied to AND gate 76 that also receives the internal clock signal on line 75. The waveform on line 74 is shown as part $r$ of FIG. 4. The output of AND gate 76 on line 78 is applied as the other input of OR gate 62. The output of OR gate 62 on line 64 is applied as the clearing input of flip-flop 66. Line 78 is also connected to line 80 to provide the toggle input to bistable flip-flop 82 having a pair of high and low outputs 116 and 122. Line 116 whose waveform is shown at FIG. 4(S) is connected as one of the inputs to AND gates 126 and 114. Line 122 which is the complement to line 116 is connected as one of the inputs to AND gate 124 and AND gate 120. These gates, 114, 120, 124 and 126 direct the correct VCO clock phase for use as internal and external clock.

The output of peak detector 84 on line 86 shown as waveform $t$ is applied as an input to AND gates 92 and 94. The output of level sense unit 88 on line 90 is also applied as an input to AND gates 92 and 94. The output of inverter 70 is further applied as an input to AND gate 92 and the input to inverter 70 is applied as an input to AND gate 94. The output of AND gate 92 is applied to a one-half bit delay unit 96 whose output on line 98 is applied as an input to OR gate 102. The output of AND gate 94 is applied via line 100 as an additional input to OR gate 102. The output of OR gate 102 shown as waveform $v$ is applied to a sample and hold unit 104. The internal clock signal on line 75 is applied to ramp generator 106 whose output shown as waveform $u$ is applied to the sample and hold unit 104. The output of sample and hold 104 is applied to a voltage controlled oscillator (VCO) 108 whose output on line 110 is applied to a one-half bit delay unit 112 and to inputs of AND gates 114 and 124. The output of the half bit delay unit 112 on line 118 is applied to inputs of AND gate 120 and AND gate 126. The outputs of AND gates 114 and 120 are applied to an OR gate 128 whose output on line 132 shown as waveform q is the decoded clock output. The outputs of gates 124 and 126 are applied to an OR gate 130 whose output on line 134 is connected to line 75 providing the internal clock signal shown as waveform $p$.

In operation, transitions in magnetic flux in the recording medium are picked up by transducer 42 and applied to line 44. The first three lines of the timing diagram, FIG. 4 ($i, j, k$), show th $do/dt$ head output waveform at the beginning, middle and end of delay line 46 whose time delay is approximately equal to one bit cell time of the data pattern.

Amplifier 52 compares the voltage waveform near the beginning of the delay line with the waveform near the middle of the line and therefore performs as a slope detector for the last "half-bit" of information to enter the line. Its output waveform is shown at FIG. 4$l$ and is positive when the voltage at $i$ is more positive than at $j$ and negative or zero when the voltage at $i$ is less than at $j$ indicating a falling slope.

Amplifier 54 compares the voltage waveform near the middle at the delay line with the waveform near the end of the line and therefore performs as a slope detector for the first "half-bit" of information to enter the line.

The output waveform for amplifier 54 is shown at $m$ and is operationally similar to amplifier 52. Both amplifiers 52 and 54 are operational amplifiers whose outputs in the present embodiment are compatible with digital gating circuits.

EXCLUSIVE OR gate 56 compares the outputs of amplifiers 52 and 54 and gives a O output when $l$ and $m$ are identical, and a 1 output when they are different, indicating opposite slopes in the first and last half of the delay line 46. The output of EXCLUSIVE OR gate 56 is shown at $n$; it will be noted that the positive pulses at $n$ correspond with the peaks of the waveform at $j$, the middle of delay line 46. The peaks of the transducer output waveform are caused by the recorded flux transitions which give rise to maximum rate of change of flux (i.e., maximum $do/dt$ during reproduce. The pulses at $n$ therefore correspond to the flux changes during record; therefore, if a pulse occurs near the middle of a bit cell it indicates a 1, or at either edge of a bit cell, a O.

The internal clock pulses at $p$ strobe latch 60 which stores the level at $n$ during the rising portion of clock $p$ and provides an output as at $o$, which is the decoded NRZ data output after the clock assumes proper synchronization to the data stream. It will be noted that $o$ corresponds with the data line above line $i$ except for the first two 1's which become O's due to the assumption of wrong clock phase at first to allow a description of the action of the clock synchronization mechanism.

The internal clock pulses at $p$ are derived from internal VCO clock 108 which is phase locked to the data. The VCO 108 output is directed either directly or after a one-half bit delay time by delay line 112 through gates 124, 126 and 130 which are controlled by bistable flip-flop 82, to become the internal clock $p$. Gates 114, 120 and 128, which are also controlled by flip-flop 82 direct the opposite of the direct or delayed VCO 108 output from that supplied to $p$ to become the clock out at $q$. In this manner, the output clock always occurs at the middle of the output NRZ data bit cell.

The VCO clock synchronization to the data stream occurs in the following manner:

The NRZ data output of latch 60 is inverted in inverter 70 and presented with its complement to AND gates 92 and 94, which direct the output of peak detector 84 either directly to OR gate 102 if $o$ is at a 1 level, or after a one-half bit delay through delay line 96 to OR gate 102 if $o$ is at a O level.

The peak detector 84 may be any conventional type, or a delay line type as described hereinafter in FIG. 5, but is located at the end of the main one bit delay line 46 so as to detect peaks as they occur at $k$. The output of OR gate 102 is shown at line $v$, where it is noted that pulses on line $t$ occur directly on line $v$ when $o$ is high or 1, and are delayed one-half bit when $o$ is low or O.

The pulses at $v$, the output of OR gate 102 allow sample and hold block 104 to obtain an instantaneous voltage sample of the voltage output of ramp generator 106 which is reset and started with each clock pulse from VCO 108 that appears on line 75 (FIG. 2*p*). The ramp generator 106 and sample and hold 104 convert the time between the VCO 108 output at *p* and the arrival of the normalized data pulses into a voltage which controls the frequency of the VCO 108. Because of the data format on tape, each data bit does not necessarily produce a synchronizing pulse, but by delaying those pulses produced by O's by one-half bit, all sample pulses are normalized so as to sample the ramp about its midpoint as can be seen by comparing line *v* and the ramp generator output at line *u*. When a sample pulse is missing the sample and hold does not sample the ramp but maintains the same voltage output it obtained from the last sample time. In this manner the VCO 108 can obtain smooth phase lock on the data stream with nonuniform time data pulses.

Because of the nature of the encoded data, the VCO can obtain phase lock on the data stream so as to properly decode the data, or invert the data sense. It is intentionally assumed VCO 108 has obtained the wrong phase lock for the first two bits and decodes them as O's, so the recovery mechanism can be explained when the first 101 sequence is encountered.

Inverter 70 also presents the output decoded data on line 72, FIG. 2*o*, and its complement on line 71 to clocked flip-flop 66, which stores the data sense on *o* during the fall time of the clock pulse on *p* which set the data, because the clock for flip-flop 66 is inverted by inverter 136. The output of flip-flop 66 is shown at *r* and becomes high each time clock *p* falls when line *o* is O. Flip-flop 66 is cleared by the output of OR gate 62 which normally happens each time a pulse occurs at *n* indicating a peak in the middle of delay line 46. An incorrect phase lock is recognized when a O is not followed by a peak before internal clock time.

AND gate 76 generates an output when flip-flop 66 is set high by a O on *o* and followed by a second clock pulse at *p* without flip-flop 66 being cleared by a pulse at *n*. The phenomenon can be observed at the second pulse on line *r* which is one-bit long because no pulse occurs on *n* after the fall of the second *p* clock pulse and before the third *p* clock pulse. The output of AND gate 76 causes flip-flop 82 to toggle as noted at line *s* which resets AND gates 114, 120, 124 and 126 so as to interchange the direct and delayed VCO 108 clock outputs on lines *p* and *q* which immediately establishes the correct VCO phase lock to the data. The remainder of the data is correctly decoded.

Note that the change at clock output pulses causes a partial ramp on line *u* but no sample pulse will occur on *v* at that time. The sample times are uniformly at mid-ramp before and after the phase change so no frequency change in the VCO will be directly caused by rephasing.

The decoded data at line *o* may be compared with the "Tape Data" pattern above line *i*. From the third bit on, after correct phase occurs, the decode correctly matches the tape data.

The purpose of level sense circuit 88 is to enable gates 92 and 94 only when a signal of sufficient amplitude exists from the head at *r* to guarantee strong noise free sync pulses from peak detector 84 to synchronize VCO 108 with the tape data. Its function is primarily to allow the VCO clock to "flywheel" through a tape data dropout by remaining at the frequency commanded by the strong data last received and to not try to readjust to the increased noise when the signal level drops. By remaining on frequency, the clock can generate a correct decode of tape data even in the presence of severe loss of amplitude. The clock will again resume data phase lock when the data level is restored following the dropout.

Figure 5:
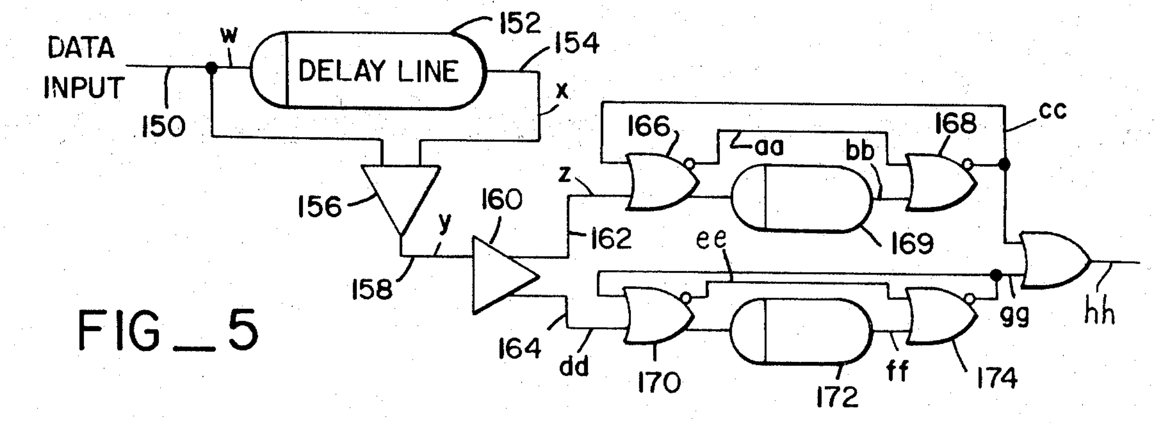
FIG. 5 is a block diagram of the peak detector used in the decoder of FIG. 3.
Figure 6:
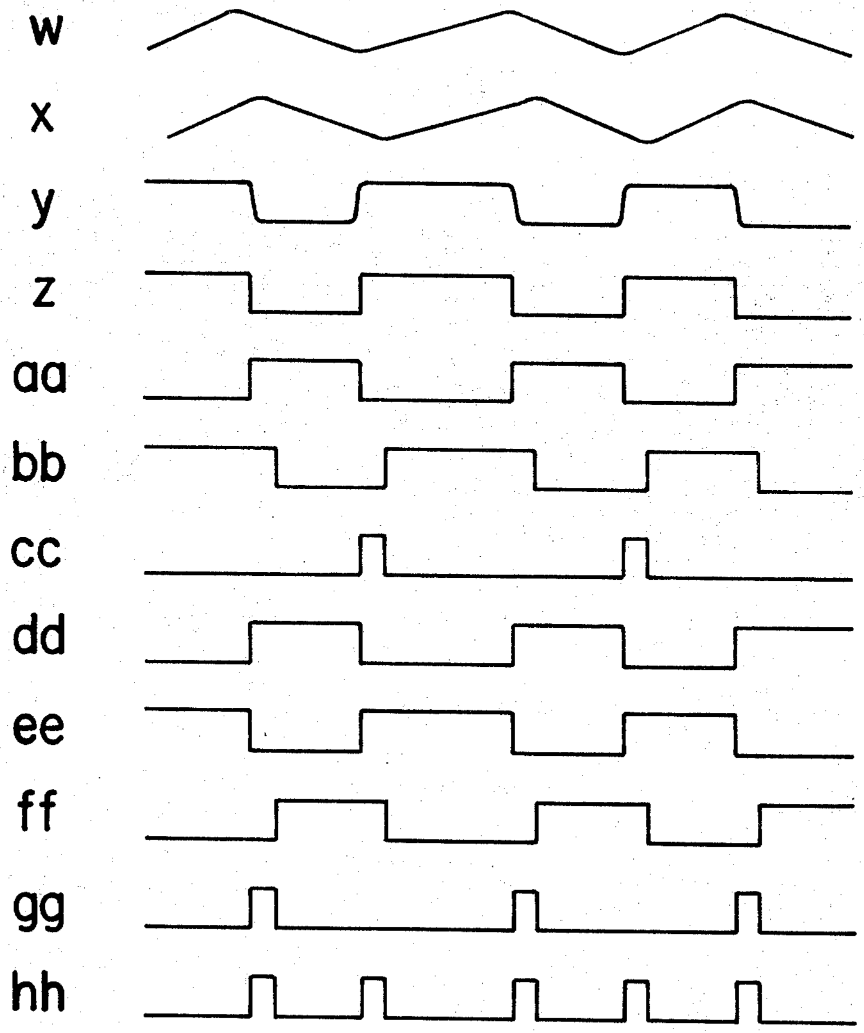
FIG. 6 is a series of waveforms useful in understanding FIG. 5.

The peak detector 84 of FIG. 3 is shown in greater detail in FIG. 5 along with accompanying waveforms of FIG. 6. The input analog waveform on line 150, FIG. 6*w*, is applied to a delay line 152 to obtain a delayed output on line 154, FIG. 6 *x*. The waveforms on lines 150 and 154 are compared by an operational amplifier 156 whose output on line 158, FIG. 6*y*, is positive for *w* greater than *x* (positive slope) and zero or negative for *w* less than *x* (negative slope). It is followed by a Schmitt trigger 160 whose function is to sharpen the transitions from amplifier 156 between positive and negative slopes when a peak is present, and to give an output on line 162, FIG. 6 *z*, and its complement on line 164, FIG. 6*dd*.

A plurality of OR gates 166, 168, 170, and 172 provided with positive logic and inverted outputs, along with delay lines 169 and 172 convert positive transitions on *z* and *dd* into pulses as shown in the timing diagram of FIG. 6. These pulses at *cc* and *gg* are then combined by OR gate 176 into a series of pulses corresponding to both the positive and negative peaks on the input waveform at *w*.

I claim:

1. A system for the magnetic recording and reproducing of an NRZ information signal and accompanying clock signal comprising encoder means receiving said information signal and clock signal to translate said signals to a single self-clocking information signal in which a transition occurs in the middle of a bit cell to represent a 1 and a transition occurs between bit cells representing two successive O's, means to record said self-clocking information signal of a magnetic medium, means to reproduce said self-clocking information signal from said magnetic decoder means receiving said self-clocking information signal to translate said signal to an NRZ information signal and a clock signal, and means receiving said reproduced signal for shifting the phase of said translated clock signal when the initial translated phase is incorrect.

2. The combination of claim 1 further comprising means receiving said reproduced signal to generate an error signal when said reproduced signal falls below a predetermined amplitude level.

3. The combination of claim 1 wherein said encoder means comprises means for storing two successive NRZ bits, whereby the first of said bits is a delayed NRZ bit, means receiving said clock signal for delaying said clock signal one-half bit, means for providing a flux transition when a delayed NRZ bit and a delayed clock signal are true or when the two successive NRZ bits are not true and the clock signal is true.

4. The combination of claim 1 wherein said decoder means comprises means for storing said self-clocking information for one bit time, and means for detecting the slope of said stored waveform during the first one-half bit and the second one-half bit of said bit time and for providing a signal of one sense when said slopes are different.

5. The combination of claim 4 wherein said decoder means further comprises means for detecting peaks occurring at the end of said one bit storage time, to provide a signal of one sense in response thereto, and means receiving said peak responsive signals for providing a clock signal.

6. An encoder for providing self-clocking modified NRZ signal in which a transition occurs in the middle of a bit cell to represent a 1 and a transition occurs between bit cells representing two successive O's in response to an input NRZ signal and clock signal comprising means for storing two successive NRZ bits, whereby the first of said bits is a delayed NRZ bit, means receiving said clock signal for delaying said clock signal one-half bit, means for providing a flux transition when a delayed NRZ bit and a delayed clock signal are true or when the two successive NRZ bits are not true and the clock signal is true.

7. An encoder for providing self-clocking modified NRZ signal in which a transition occurs in the middle of a bit cell to represent a 1 and a transition occurs between bit cells representing two successive O's in response to an input NRZ signal and clock signal comprising means for storing two successive NRZ bits, whereby the first of said bits is a delayed NRZ bit, means for providing a true signal when the two successive stored NRZ bits are O's, means receiving said clock signal for providing a flux transition when said true signal and clock signal are simultaneous, means receiving said clock signal for delaying said clock signal one-half bit, and means receiving said one-half bit delayed clock signal and the last stored NRZ bit for providing a flux transition when said last stored NRZ bit is a 1 and is simultaneous with said one-half bit delayed clock signal.

8. A decoder for providing an NRZ signal and clock signal in response to a waveform having transitions which occur in the middle of a bit cell to represent a 1 and transitions which occur between bit cells representing two successive O's comprising means for providing a pulse in response to each peak in said waveform, means phase locked to said waveform peaks for providing clock signals of first and second phases, means for selecting the correct clock signal phase as the output clock signal, and means receiving said pulses and the other clock signal phase for providing an NRZ output signal.

9. The combination of claim 8 further comprising means for generating an error signal when the waveform amplitude falls below a predetermined level.

10. A decoder for providing an NRZ signal and clock signal in response to a waveform having transitions which occur in the middle of a bit cell to represent a 1 and transitions which occur between bit cells representing two successive O's comprising means for providing a pulse in response to each peak in said waveform, means phase locked to said pulses for providing first clock signals and second clock signals delayed one-half bit from said first clock signals, means receiving said pulses and one of said clock signals for providing an output NRZ signal, means for providing said other clock signals as the output clock signal, and means for reversing said clock signals in response to a 101 code sequence when the output clock signal phase is incorrect.

11. The combination of claim 10 wherein said phase locked means includes a flywheel type oscillator and further comprising means for removing said pulses from said phase locked means when the waveform amplitude falls below a predetermined level.

* * * * *